United States Patent
Liu

(10) Patent No.: US 6,231,145 B1
(45) Date of Patent: May 15, 2001

(54) MOBILE RACK ASSEMBLY FOR HARD DISK DRIVER

(76) Inventor: Shen-Yi Liu, No. 123, Hsin I S. St., Taichung (TW)

( * ) Notice: Subject to any disclaimer, the term of this patent is extended or adjusted under 35 U.S.C. 154(b) by 0 days.

(21) Appl. No.: 09/436,996

(22) Filed: Nov. 9, 1999

(51) Int. Cl.[7] .............................. A47B 88/00; G06F 1/16
(52) U.S. Cl. ................................... 312/332.1; 312/223.2; 361/685; 361/727
(58) Field of Search ............................ 312/332.1, 223.1, 312/223.2, 330.1, 348.1, 348.6; 361/683, 685, 725, 726, 727, 724, 747; 174/52.1; 439/928.1

(56) References Cited

U.S. PATENT DOCUMENTS

| | | | |
|---|---|---|---|
| 4,472,763 | * 9/1984 | Loris | 312/332.1 X |
| 5,442,513 | * 8/1995 | Lo | 361/685 |
| 5,563,767 | * 10/1996 | Chen | 361/685 |
| 5,694,290 | * 12/1997 | Chang | 361/685 |
| 5,767,445 | * 6/1998 | Wu | 361/685 X |
| 5,797,667 | * 8/1998 | Wu | 312/332.1 |
| 5,959,834 | * 9/1999 | Chang | 361/685 |
| 6,011,701 | * 1/2000 | Kopp et al. | 312/223.2 X |

* cited by examiner

Primary Examiner—James O. Hansen
(74) Attorney, Agent, or Firm—Rosenberg, Klein & Lee

(57) ABSTRACT

A mobile rack assembly for hard disk driver comprising a mounting bracket having two aluminum extrusion plates formed on both sides thereof and each having a guiding rail; and a mobile rack arranged within the mounting bracket and having an aluminum extrusion stage which has a plurality of sliding rails corresponding to the guiding rail on two lateral sides thereof; the aluminum extrusion stage having two recesses on upper side thereof and for mounting of an aluminum extrusion cover. The aluminum extrusion cover has a plurality of heat dissipation grooves on the top surface thereof and a locking hole. To mount the mobile rack, the mobile rack is inserted into the mounting bracket with the sliding rails lying against the guiding rail until he mobile rack reaches the rear end of the mounting bracket.

10 Claims, 5 Drawing Sheets

MOBILE RACK ASSEMBLY FOR HARD DISK DRIVER

FIELD OF THE INVENTION

The present invention relates to a mobile rack assembly for hard disk driver, especially to a mobile rack for hard disk driver wherein two aluminum extrusion plates formed on both sides of the mounting bracket thereof and an aluminum extrusion stage and an aluminum extrusion cover are provided to the mobile rack.

BACKGROUND OF THE INVENTION

The conventional mobile rack assembly for hard disk driver generally comprises a mobile rack with a handgrip. The left and right arms of the handgrip each has an arc-shaped end which has an arc-shaped dent and a straight dent along the lengthwise direction of the arm. A locking part is formed between the arc-shaped dent and the straight dent. The mobile rack assembly for hard disk driver further comprises a mounting bracket with an opening. The opening has a folded plate and a T-shaped block beside the folded plate such that a dent is formed between the folded plate and the T-shaped block. The T-shaped block has an L-shaped stop bump on the outer surface thereof. However, the conventional mobile rack assembly for hard disk driver has serious problem of electromagnetic interference when being made of plastic material and has poor heat dissipation effect when being made of metal material.

It is the object of the invention to provides a mobile rack assembly for hard disk driver which can overcome above mentioned problem. To achieve this object, the mobile rack assembly for hard disk driver according to the present invention comprises a mounting bracket having two aluminum extrusion plates formed on both sides thereof; and a mobile rack arranged within the mounting bracket and having an aluminum extrusion stage and an aluminum extrusion cover to facilitate the mounting and removal thereof. The aluminum extrusion cover has a plurality of heat dissipation grooves on top surface thereof to facilitate heat dissipation and block electromagnetic interference.

The various objects and advantages of the present invention will be more readily understood from the following detailed description when read in conjunction with the appended drawing, in which:

DETAIL DESCRIPTION OF PREFERRED EMBODIMENT

Figure 1:
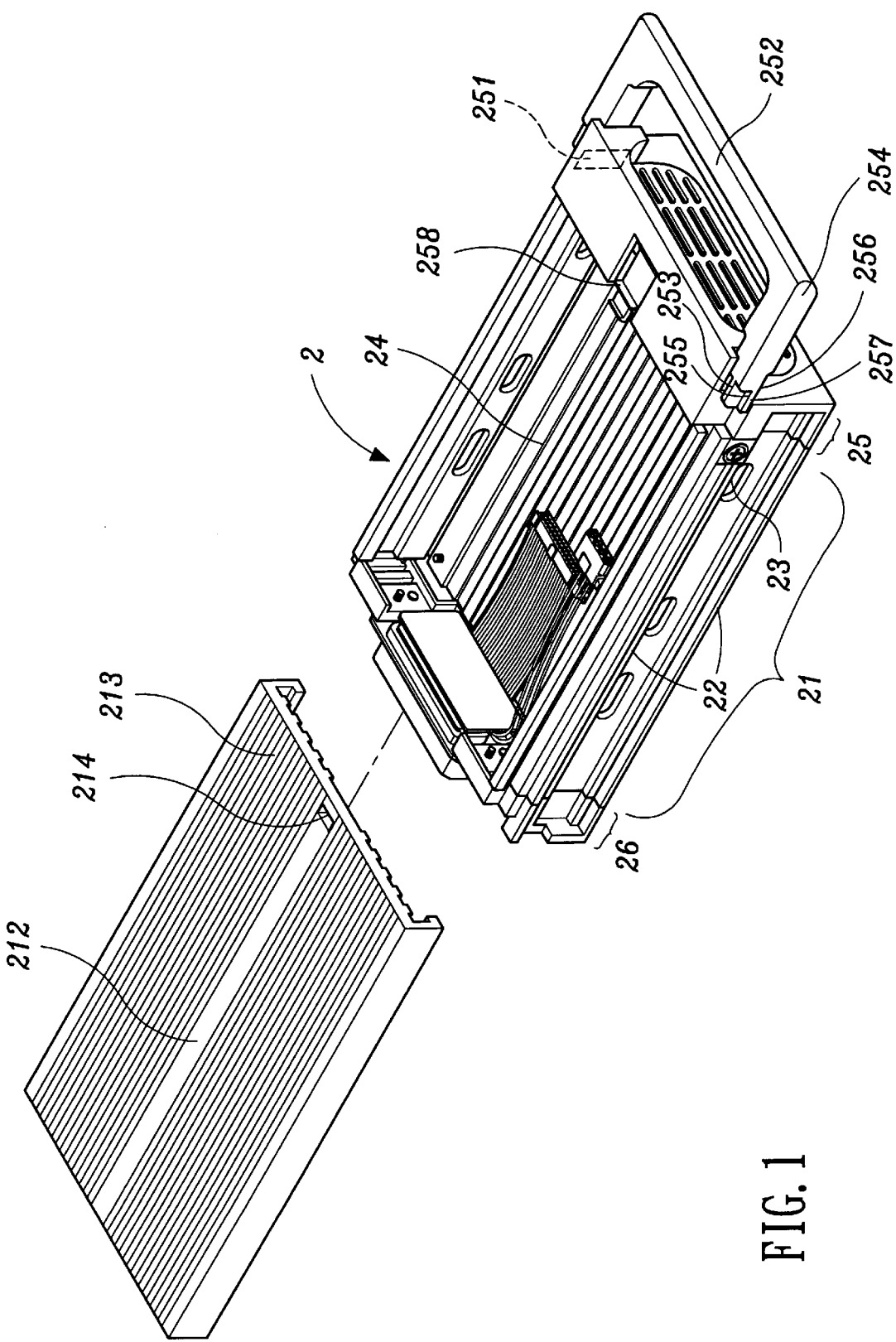
FIG. 1 is the exploded view of the preferred embodiment of the present invention.
Figure 2:
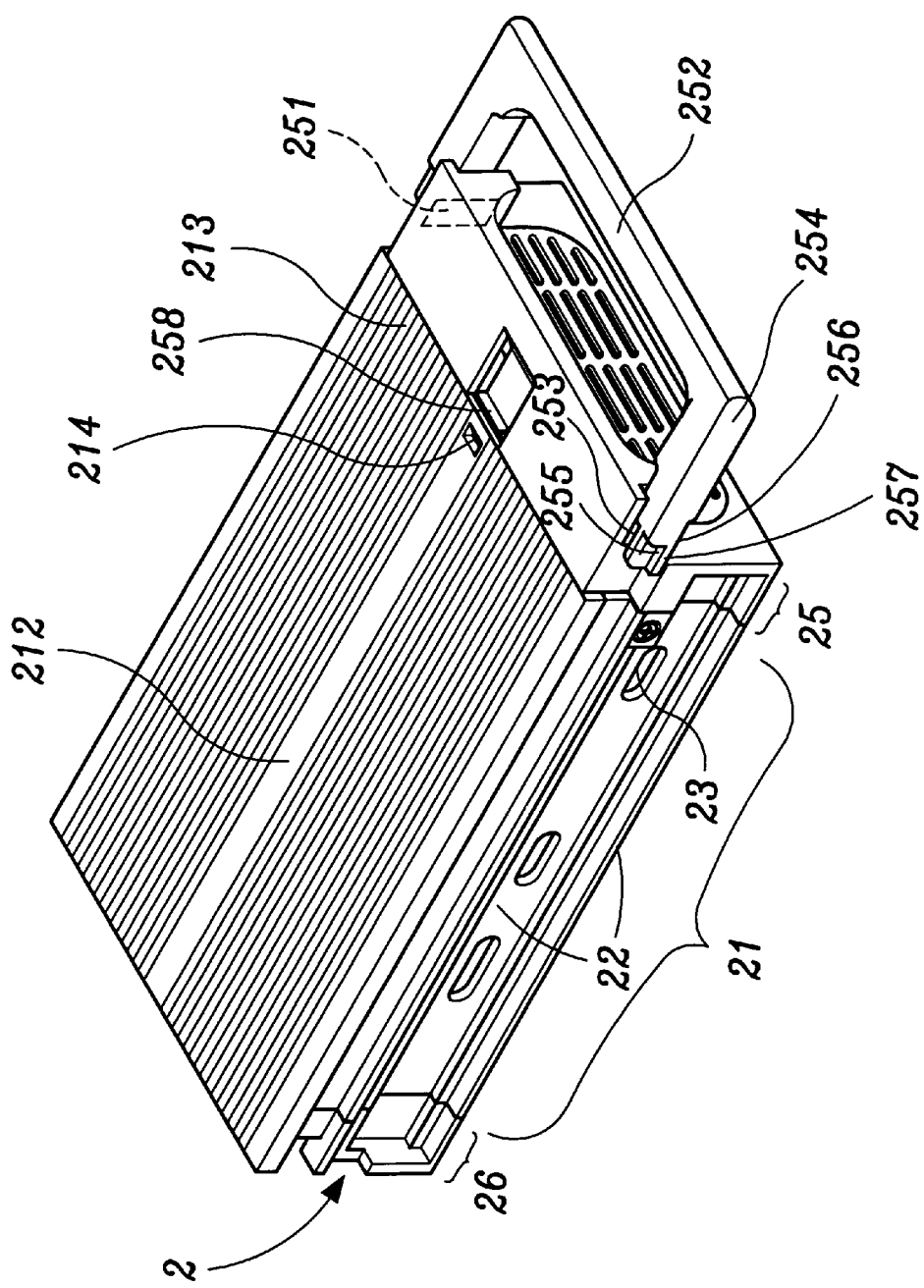
FIG. 2 is the perspective view of the preferred embodiment of the present invention.
Figure 3A:
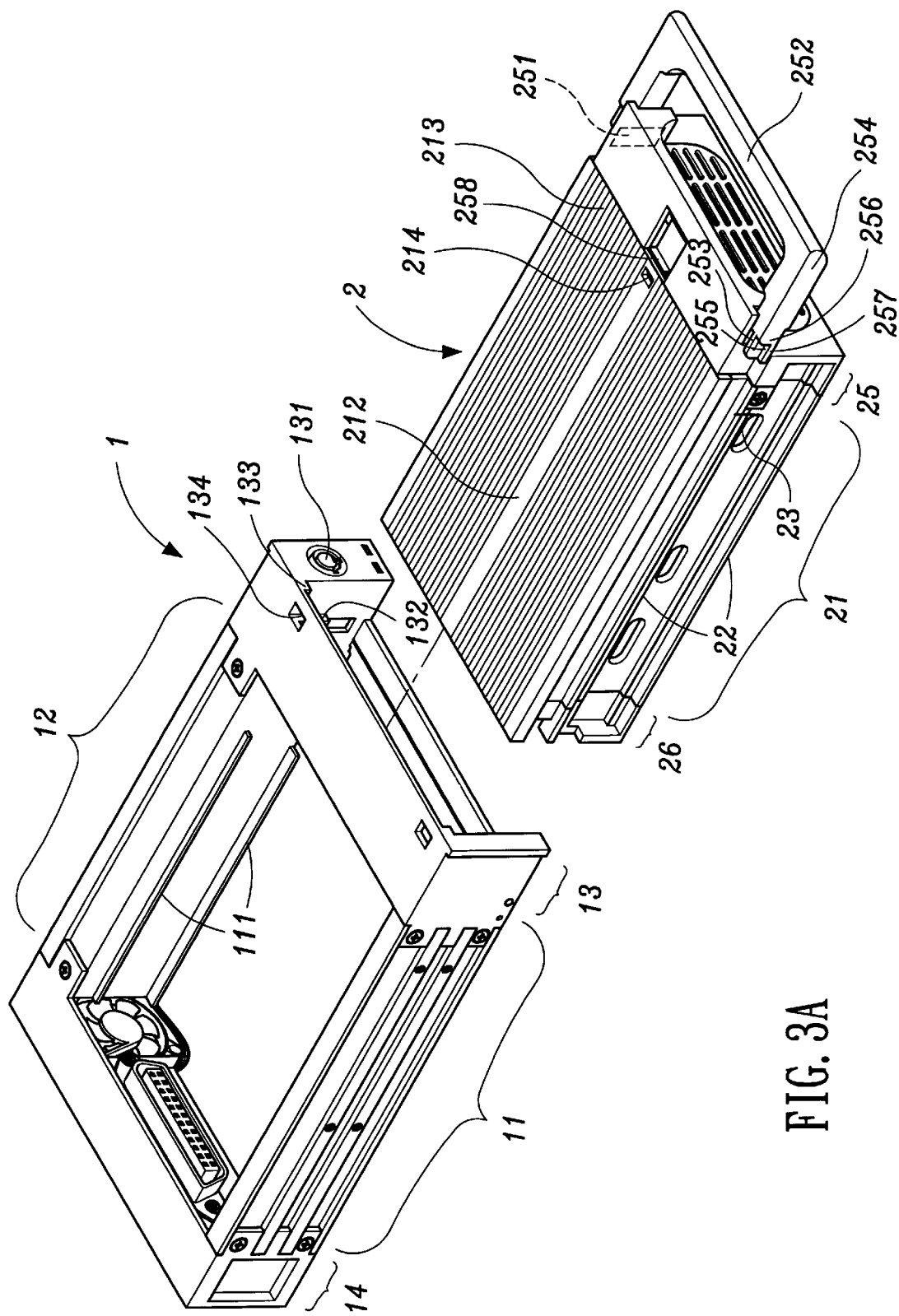
FIG. 3A is an exploded view showing the assembling of the present invention.
Figure 3B:
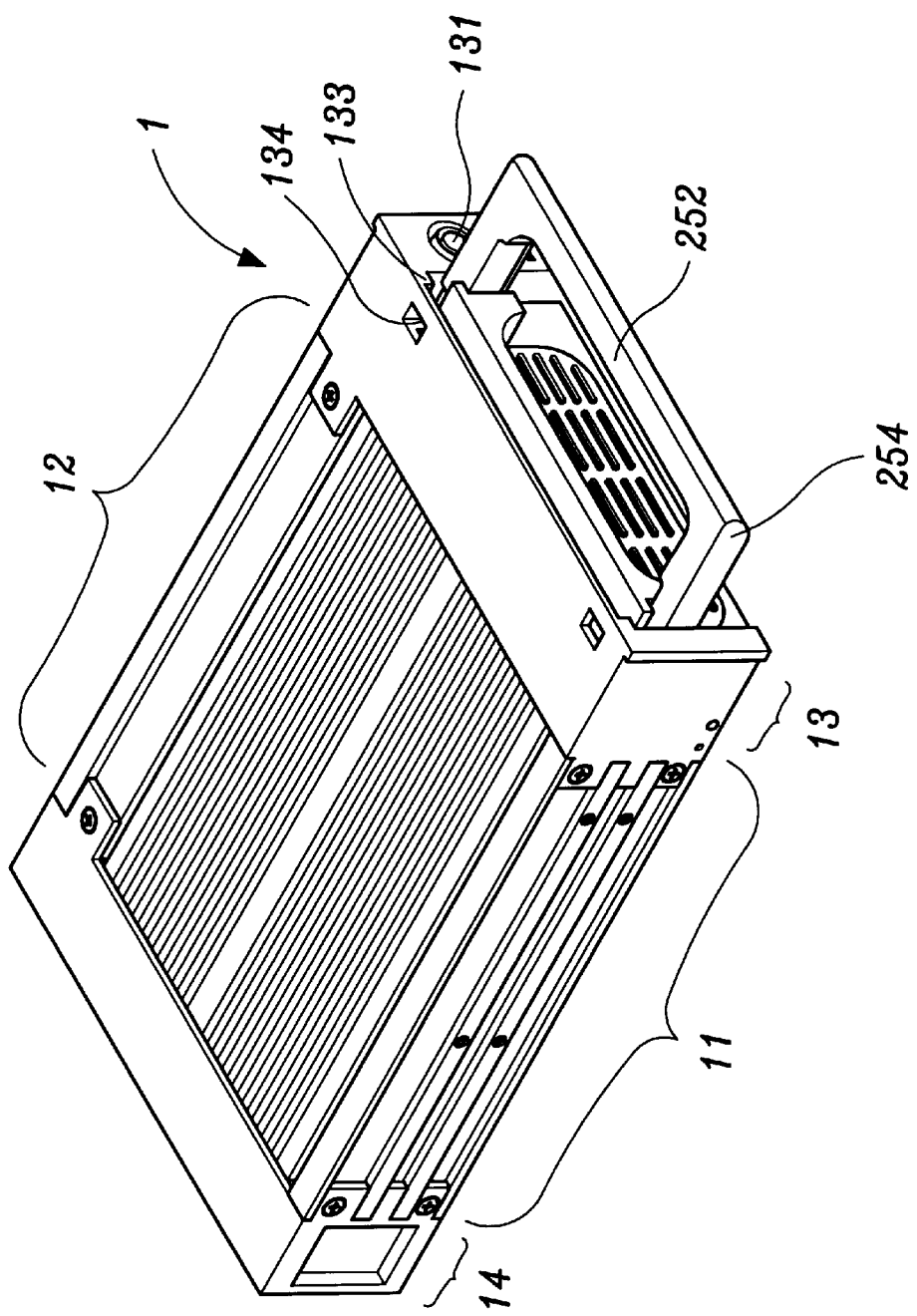
FIG. 3B is a perspective view showing the assembling of the present invention.
Figure 3C:
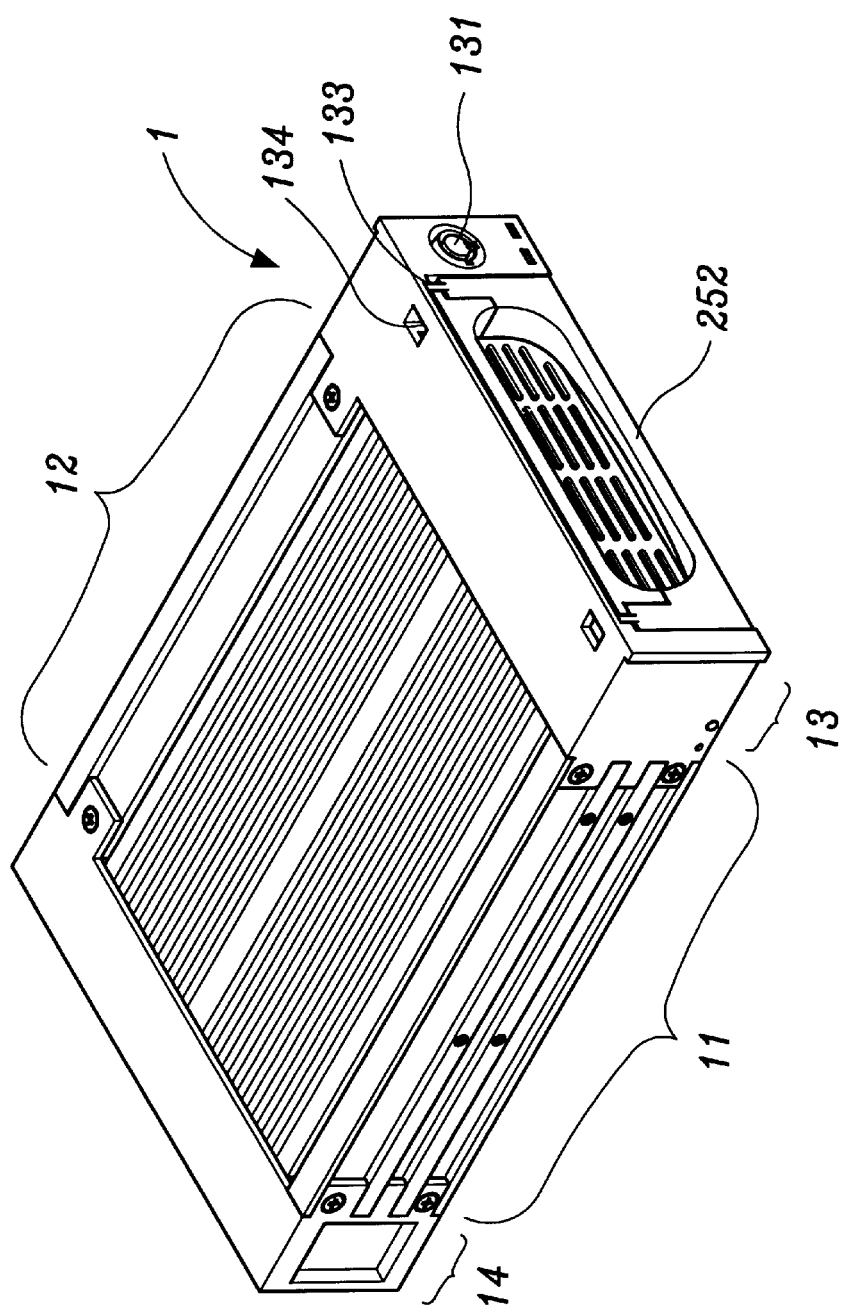
FIG. 3C is a perspective view showing the assembled result of the present invention.

With reference now to FIGS. 1 to 3C, the mobile rack assembly for hard disk driver according to the present invention comprises a mounting bracket 1 and a mobile rack 2.

The mounting bracket 1 has two aluminum extrusion plates 11 and 12 parallel formed on two lateral sides thereof. Each aluminum extrusion plate has a guiding rail 111 on inner side thereof and a plastic front frame 13 on front side thereof. The front frame 13 has a rotary lock 131 on one side thereof and an L-shape stop bump 132 and a flange 133 on two inner sides thereof. A locking dent 134 is formed between the L-shape stop bump 132 and the flange 133. The two aluminum extrusion plates 11 and 12 are screwed to a plastic rear frame 14 on rear sides thereof.

The mobile rack 2 is mounted within the mounting bracket 1 and has a U-shaped aluminum extrusion stage 21, a plurality of sliding rails 22 on outer side thereof and corresponding to the guiding rail 111 and has a plurality of heat dissipating holes 23 on outer sides thereof. The U-shaped aluminum extrusion stage 21 has a plurality of heat dissipating grooves 24 on inner bottom side thereof. A plastic handle frame 25 is screwed on the front side of the U-shaped aluminum extrusion stage 21 and has a locking hole 251 corresponding to the rotary lock 131. A handgrip 252 is pivotally arranged on the plastic handle frame 25 and has two arc-shaped ends 253 on two pivot ends thereof. The arc-shaped end 253 has an arc-shaped dent 255 and a straight dent 256 on the upper surface and lower surface of the lateral arm 254 of the plastic handle frame 25. A locking part 257 is formed between the arc-shaped dent 255 and the straight dent 256. A hook 258 is formed on the upper side of the plastic handle frame 25. The U-shaped aluminum extrusion stage 21 can also be screwed to a plastic rear frame 26 on rear side thereof. The U-shaped aluminum extrusion stage 21 has two recesses 211 formed on upper side thereof for mounting an aluminum extrusion cover 212. The aluminum extrusion cover 212 has a plurality of heat dissipating grooves 213 on top surface and a locking hole 214 on bottom surface thereof and corresponding to the hook 258.

To mount the mobile rack 2, the handgrip 252 of the mobile rack 2 is firstly moved to a horizontal position and the mobile rack 2 is inserted into the mounting bracket 1 with the sliding rails 22 lying against the guiding rail 111 until he mobile rack 2 reaches the rear end of the mounting bracket 1. Afterward, the handgrip 252 of the mobile rack 2 is pressed such that the locking part 257 is locked to the locking dent 134, the arc-shaped dent 255 of the handgrip 252 is engaged with the flange 133 and the straight dent 256 is engaged with the L-shape stop bump 132. In this way, the mobile rack 2 is received within the mounting bracket 1. Afterward, a key (not shown) is used to rotate the rotary lock 13 1 to lock on the locking hole 251 such that the mobile rack 2 is firmly retained within the mounting bracket 1.

The present invention has following advantages:

1. The mounting bracket is provided with two aluminum extrusion plates on both sides thereof and the mobile rack 2 is provided with an aluminum extrusion stage and an aluminum extrusion cover to facilitate the mounting and removal of the hard disk driver.

2. The aluminum extrusion cover is provided with a plurality of heat dissipating grooves to enhance the heat dissipating effect.

3. The electromagnetic interference is blocked by the inventive mobile rack assembly.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A portable rack assembly for supporting a hard disk drive in electromagnetic interference shielded manner comprising:

(a) a mounting bracket defining a first compartment, said mounting bracket including at least a pair of aluminum extrusion plates extending along opposed sides thereof, each said aluminum extrusion plate having formed thereon a guiding rail protruding into said first compartment; and, (b) a mobile rack received in said first compartment of said mounting bracket, said mobile rack including:

(1) an aluminum extrusion stage defining a second chamber for housing the hard disk drive, said aluminum extrusion stage having a substantially solid bottom side and a pair of lateral sides extending upward therefrom, said bottom side having formed therein a plurality of elongate heat dissipation grooves spaced one from another, each said lateral side having formed thereon a plurality of sliding rails for slidably engaging said guiding rails of said mounting bracket; and, (2) an aluminum extrusion cover detachably coupled to said aluminum extrusion stage for enclosing said second chamber, said aluminum extrusion cover having formed on a substantially solid top surface thereof a plurality of elongate heat dissipating grooves spaced one from another.

2. The portable rack assembly as recited in claim 1 wherein said mounting bracket further includes a plastic front frame fastened to front portions of said aluminum extrusion plates.

3. The portable rack assembly as recited in claim 2 wherein said front frame includes a rotary lock mounted thereto.

4. The portable rack assembly as recited in claim 1 wherein said mounting bracket further includes a plastic rear frame fastened to rear portions of said aluminum extrusion plates.

5. The portable rack assembly as recited in claim 1 wherein said aluminum extrusion stage of said mobile rack describes a substantially U-shaped sectional contour.

6. The portable rack assembly as recited in claim 1 wherein each said lateral side of said mobile rack aluminum extrusion stage has formed therein a plurality of holes for the escape of heat therethrough.

7. The portable rack assembly as recited in claim 1 wherein said aluminum extrusion cover of said mobile rack has formed therein a locking hole.

8. The portable rack assembly as recited in claim 7 wherein said mobile rack further includes a plastic handle frame coupled to a front portion of said aluminum extrusion stage, said handle frame having formed at an upper portion thereof a hook for releasably engaging said locking hole of said aluminum extrusion cover.

9. The portable rack assembly as recited in claim 7 wherein said mobile rack further includes a plastic handle frame coupled to a front portion of said aluminum extrusion stage, said handle frame having formed at an upper portion thereof a hook for releasably engaging said locking hole of said aluminum extrusion cover, and at a lateral portion thereof a locking hole for engaging said rotary lock of said mounting bracket front frame.

10. The portable rack assembly as recited in claim 7 wherein said mobile rack further includes a plastic rear frame member fastened to a rear portion of said aluminum extrusion stage.

* * * * *